(12) United States Patent
Seo et al.

(10) Patent No.: US 11,523,058 B2
(45) Date of Patent: Dec. 6, 2022

(54) ELECTRONIC DEVICE WITH CAMERA MODULE

(71) Applicant: SAMSUNG ELECTRO-MECHANICS CO., LTD., Suwon-si (KR)

(72) Inventors: Bo Sung Seo, Suwon-si (KR); Young Bok Yoon, Suwon-si (KR); Nam Ki Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/082,242

(22) Filed: Oct. 28, 2020

(65) Prior Publication Data
US 2021/0281759 A1    Sep. 9, 2021

(30) Foreign Application Priority Data

Mar. 3, 2020   (KR) ........................ 10-2020-0026789
May 29, 2020   (KR) ........................ 10-2020-0065281

(51) Int. Cl.
*H04N 5/232*       (2006.01)
*G02B 27/64*       (2006.01)
(Continued)

(52) U.S. Cl.
CPC .......... *H04N 5/23287* (2013.01); *G02B 7/09* (2013.01); *G02B 27/646* (2013.01); *G03B 5/00* (2013.01);
(Continued)

(58) Field of Classification Search
None
See application file for complete search history.

(56) References Cited

U.S. PATENT DOCUMENTS 4,199,785 A * 4/1980 McCullough ........ H04N 5/2628 348/704
10,326,942 B2 * 6/2019 Shabtay ............. G02B 13/0015
(Continued)

FOREIGN PATENT DOCUMENTS

CN    104181667 A    12/2014
JP    2008-3130 A    1/2008
(Continued)

OTHER PUBLICATIONS

Korean Office Action dated Jun. 22, 2021 in counterpart Korean Patent Application No. 10-2020-0065281 (7 pages in English, 6 pages in Korean).
(Continued)

*Primary Examiner* — Quan Pham
(74) *Attorney, Agent, or Firm* — NSIP Law

(57) ABSTRACT

A camera module includes a housing, and a first frame and a second frame sequentially disposed in the housing in an optical axis direction. The second frame includes a lens module configured to rotate together with the second frame about a first rotation axis and a second rotation axis, intersecting an optical axis direction. The first rotation axis is formed between the housing and an opposing surface of the first frame in the optical axis direction by first ball members disposed in a direction intersecting the optical axis direction. The second rotation axis is formed between the first fame and an opposing surface of the second frame in the optical axis direction by second ball members disposed in a direction intersecting the optical axis direction and the first rotation axis direction.

28 Claims, 17 Drawing Sheets

(51) Int. Cl.
  *G03B 5/00*   (2021.01)
  *G02B 7/09*   (2021.01)
  *H04N 5/225*  (2006.01)
  *H04N 5/247*  (2006.01)
  *G03B 13/36*  (2021.01)

(52) U.S. Cl.
  CPC ........... *G03B 13/36* (2013.01); *H04N 5/2252* (2013.01); *H04N 5/2253* (2013.01); *H04N 5/2254* (2013.01); *H04N 5/247* (2013.01); *G03B 2205/0023* (2013.01)

(56) References Cited

U.S. PATENT DOCUMENTS

| | | | |
|---|---|---|---|
| 2011/0075999 A1* | 3/2011 | Chiu | H04N 5/2254 396/55 |
| 2015/0055231 A1 | 2/2015 | Hagiwara | |
| 2016/0124242 A1 | 5/2016 | Minamisawa | |
| 2016/0241786 A1 | 8/2016 | Minamisawa | |
| 2017/0085798 A1 | 3/2017 | Kang et al. | |
| 2018/0109660 A1* | 4/2018 | Yoon | G02B 13/0035 |
| 2018/0267294 A1* | 9/2018 | Aschwanden | H02K 33/00 |
| 2018/0367714 A1 | 12/2018 | Im et al. | |
| 2019/0018259 A1 | 1/2019 | Minamisawa et al. | |
| 2019/0294027 A1 | 9/2019 | Kim et al. | |
| 2019/0369678 A1 | 12/2019 | Park et al. | |
| 2020/0012068 A1* | 1/2020 | Lim | H04N 5/2253 |

FOREIGN PATENT DOCUMENTS

| | | |
|---|---|---|
| JP | 2015-023343 A | 2/2015 |
| JP | 2019191350 A * | 10/2019 |
| KR | 10-2016-0013915 A | 2/2016 |
| KR | 10-2016-0063329 A | 6/2016 |
| KR | 10-2018-0024145 A | 3/2018 |
| KR | 10-2018-0137277 A | 12/2018 |
| KR | 10-2019-0007377 A | 1/2019 |
| KR | 10-2009197 B1 | 8/2019 |
| KR | 10-2019-0137657 A | 12/2019 |

OTHER PUBLICATIONS

Chinese Office Action dated Feb. 9, 2022 in the corresponding Chinese Patent Application No. 202110041878.X. (15 pages in English and 12 pages in Chinese).

* cited by examiner

II-II'

III-III'

ELECTRONIC DEVICE WITH CAMERA MODULE

CROSS-REFERENCE TO RELATED APPLICATION(S)

This application claims the benefit under 35 USC 119(a) of Korean Patent Application Nos. 10-2020-0026789 filed on Mar. 3, 2020, and 10-2020-0065281 filed on May 29, 2020, in the Korean Intellectual Property Office, the entire disclosures of which are incorporated herein by reference for all purposes.

BACKGROUND

1. Field

This application relates to an electronic device with a camera module.

2. Description of Related Art

Recently, subminiature camera modules have been installed in mobile communications terminals (electronic devices) such as tablet personal computers (PCs), laptop computers, and the like, in addition to smartphones.

With the miniaturization of mobile communications terminals, the quality of images captured therewith may be degraded due to a significant effect of hand-shake while images are captured. Accordingly, a technology for compensating for hand-shake may be desired to obtain clear images.

When hand-shake occurs while images are captured, an optical image stabilization (OIS) actuator may be used to compensate for the hand-shake. The OIS actuator may move a lens module in a direction perpendicular to an optical axis.

However, since a shake of the camera module does not always occur only in the direction perpendicular to the optical axis, there may be a limitation in compensating for the shake when the lens module is moved in the direction perpendicular to the optical axis.

Existing optical imaging stabilization (OIS) modules may prevent a small amount of hand-shake by moving a lens module horizontally in a plurality of directions, perpendicular to an optical axis. However, such existing OIS modules may be limited in compensating for continuous shake that occur when moving images are captured.

Since existing optical imaging stabilization (OIS) modules may prevent a small amount of hand-shake by horizontally moving a lens module in a plurality of directions perpendicular to an optical axis. A conventional OIS module involves a limitation in implementing a tracking function required as an additional function when moving images are captured.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, and a first frame and a second frame sequentially disposed in the housing in an optical axis direction. The second frame includes a lens module configured to rotate together with the second frame about a first rotation axis and a second rotation axis, intersecting an optical axis direction. The first rotation axis is formed between the housing and an opposing surface of the first frame in the optical axis direction by first ball members disposed in a direction intersecting the optical axis direction. The second rotation axis is formed between the first fame and an opposing surface of the second frame in the optical axis direction by second ball members disposed in a direction intersecting the optical axis direction and the first rotation axis direction.

The first ball members and the second ball members may be disposed to respectively rotate in the same positions thereof or to be maintained in a fixed state.

An intersection of the first rotation axis and the second rotation axis may coincide with the optical axis.

The first rotation axis and the second rotation axis may intersect at right angles.

The housing may have a rectangular box contour, and each of the first rotation axis and the second rotation axis may be diagonally formed with respect to the housing.

The second frame may include an image sensor disposed below the lens module, and the image sensor may rotate together with the lens module.

An optical axis of the lens module may correspondingly change with the rotation of the second frame.

The second frame may include a sensor substrate on which the image sensor is mounted, and the sensor substrate may be connected to a main substrate, included in the housing, by a flexible substrate.

The flexible substrate may include a signal or power line divided into a plurality of signal or power lines separated from each other.

The flexible substrate may include flexible substrates each connected to an edge of the main substrate to form a cross.

The second frame or the lens module may include a first magnetic material, the housing or an auxiliary member connected to the housing comprises a second magnetic material, and the second frame may be attracted to the housing by a magnetic force of the first magnetic material and the second magnetic material.

The first magnetic material may be an attractive magnet and the second magnetic material may be an attractive yoke.

The first magnetic material and the second magnetic material may be disposed to be spaced at regular intervals along an optical axis.

In another general aspect, a camera module includes a fixed portion including a housing and a rotation module portion disposed in the housing and forming a movable portion. The rotation module portion includes a lens module, an image sensor, and a first magnetic material. The lens module and the image sensor are configured to rotate about a first rotation axis and a second rotation axis, intersecting an optical axis direction. The fixed portion includes a second magnetic material, and the rotation module portion is attracted to the fixed portion by a magnetic force of the first magnetic material and the second magnetic material.

The first magnetic material and the second magnetic material may be disposed to be spaced at regular intervals along an optical axis.

In another general aspect, an electronic device includes a plurality of camera modules having different fields of view. One of the camera modules includes a housing, and a first frame and a second frame sequentially disposed in the housing in an optical axis direction. The second frame includes a lens module configured to rotate together with the second frame about a first rotation axis and a second rotation axis, intersecting an optical axis direction. The first rotation axis is formed between the housing and an opposing surface of the first frame in the optical axis direction by first ball members disposed in a direction intersecting the optical axis direction. The second rotation axis is formed between the first fame and an opposing surface of the second frame in the optical axis direction by second ball members disposed in a direction intersecting the optical axis direction and the first rotation axis direction.

The first ball members and the second ball members may be disposed to respectively rotate in the same positions thereof or to be maintained in a fixed state.

An intersection of the first rotation axis and the second rotation axis may coincide with the optical axis.

The first rotation axis and the second rotation axis may intersect at right angles.

The housing may have a rectangular contour, and each of the first rotation axis and the second rotation axis maybe diagonally formed with respect to the housing.

The second frame may include an image sensor disposed below the lens module, and the image sensor may rotate together with the lens module.

An optical axis of the lens module may correspondingly change with the rotation of the second frame.

The second frame ay include a sensor substrate on which the image sensor is mounted, and the sensor substrate may be connected to a main substrate, included in the housing, by a flexible substrate.

The flexible substrate may include a signal or power line divided into a plurality of signal or power lines separated from each other.

The flexible substrate may include flexible substrates each connected to an edge of the main substrate to form a cross.

The second frame or the lens module may include a first magnetic material, the housing or an auxiliary member connected to the housing may include a second magnetic material, and the second frame may be attracted to the housing by a magnetic force of the first magnetic material and the second magnetic material.

The first magnetic material may be an attractive magnet and the second magnetic material may be an attractive yoke.

The first magnetic material and the second magnetic material may be disposed to be spaced at regular intervals along an optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The present disclosure relates to a camera module and may be applied to portable electronic devices such as mobile communications terminals, smartphones, tablet PCs, and the like.

A camera module is an optical device for capturing still or moving images. A camera module may include a lens, refracting light reflected from a subject, and a lens driving device moving the lens to adjust a focus or to compensate for shake.

An aspect of the present disclosure is to provide a camera module, capable of easily adjusting shake, even in moving images, obtained by imaging a moving subject, as well as still images obtained by imaging a fixed subject.

An aspect of the present disclosure is to provide a camera module rotatable at an angle wide enough to implement a tracking function when moving images are captured.

Figure 1:
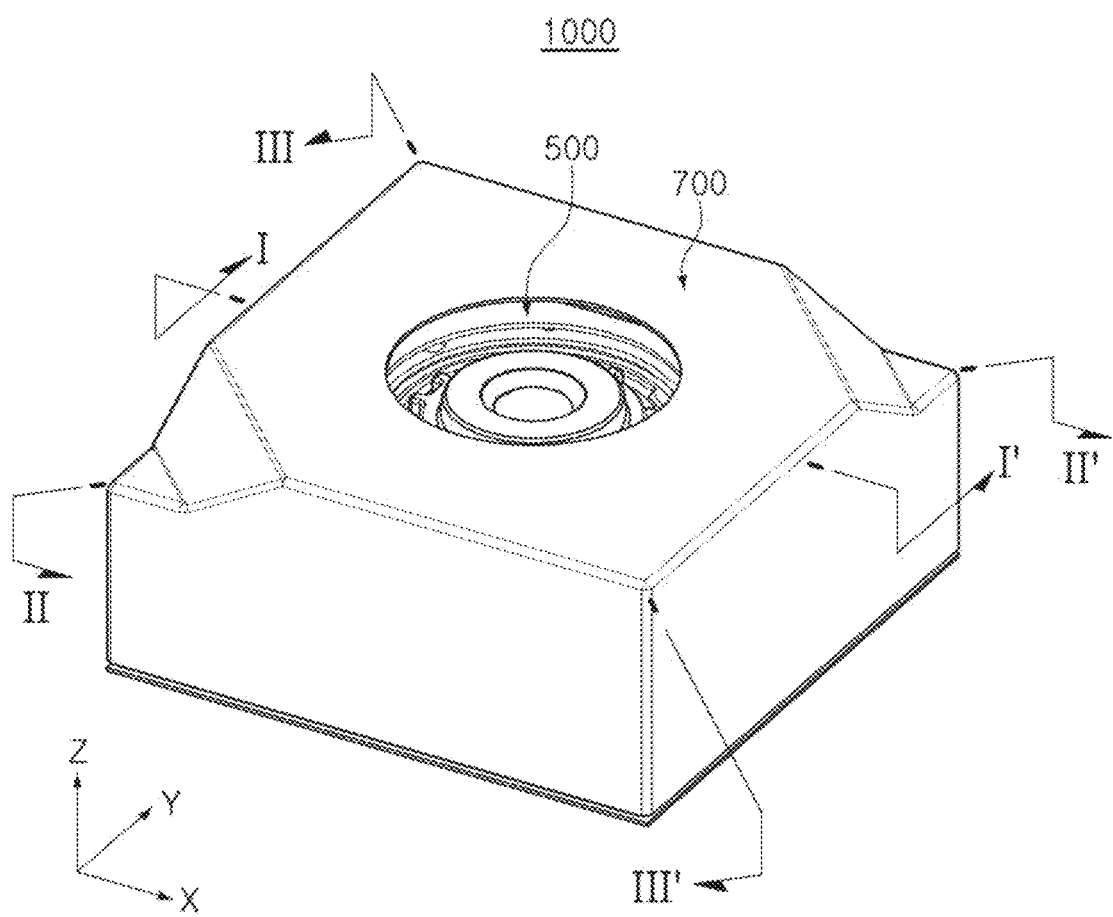
FIG. 1 is an assembled perspective view of a camera module according to an example.
Figure 2:
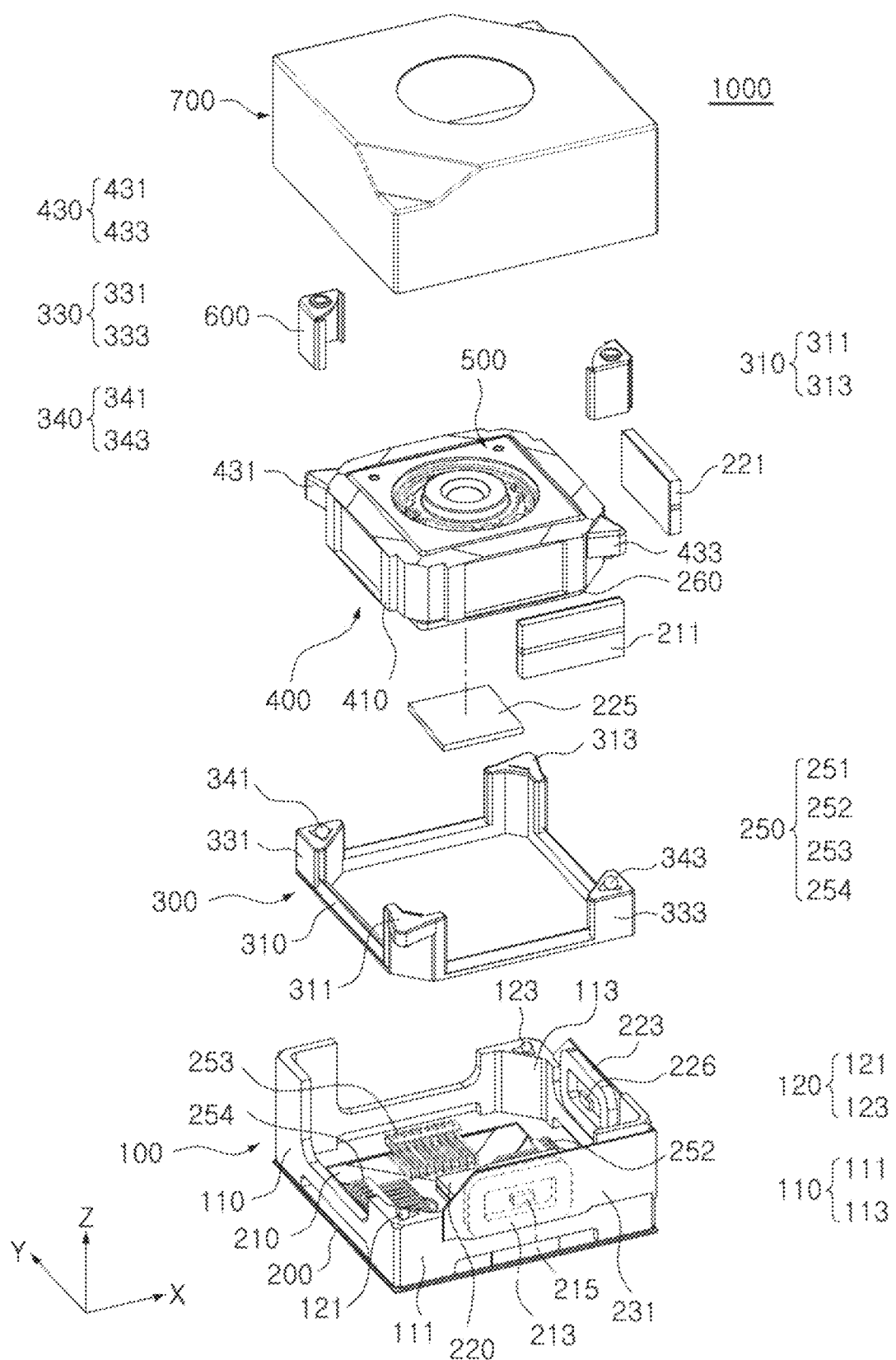
FIG. 2 is an exploded perspective view of a camera module according to an example.

FIG. 1 is an assembled perspective view of a camera module according to an example, and FIG. 2 is an exploded perspective view of a camera module according to an example.

Referring to FIGS. 1 and 2, a camera module 1000, according to an example, may include a shake compensation module disposed in the housing 100. The shake compensation module may include an autofocusing module disposed therein.

The shake compensation module (or a rotation module, for ease of description, hereinafter referred to a shake compensation module) may be implemented by a body 110 of a housing 100, a first frame 300 and a second frame 400 sequentially disposed in the housing 100 in an optical axis direction (a Z-axis direction), and a shake compensation actuator. The first frame 300 and the second frame 400 may be a shake compensation portion (or a rotation module portion, for ease of description, hereinafter referred to as a shake compensation portion) rotating inside of the housing 100 to implement shake compensation (or tracking).

For example, the shake compensation portion constituting a movable portion may include a lens module and an image sensor, and the movable portion (the shake compensation portion, the lens module, and the image sensor) may rotate relative to a fixed portion including the housing 100.

The autofocusing module may be implemented by a lens module 500 disposed in the second frame 400, and the lens module 500 may include an actuator for implementing an autofocusing function.

Since the autofocusing module is disposed in the shake compensation module, an autofocusing actuator, including a coil and a magnet constituting the autofocusing module, and an image sensor are moved together during the implementation of shake compensation. Therefore, in this example, a structure of a connection substrate 250 for supplying power and transmitting a control signal to an autofocusing coil and an image sensor is required.

Hereinafter, the shake compensation module will be described in further detail, and the structure of the connection substrate 250, connected to the autofocusing module disposed in the shake compensation module, will be described.

Figure 3:
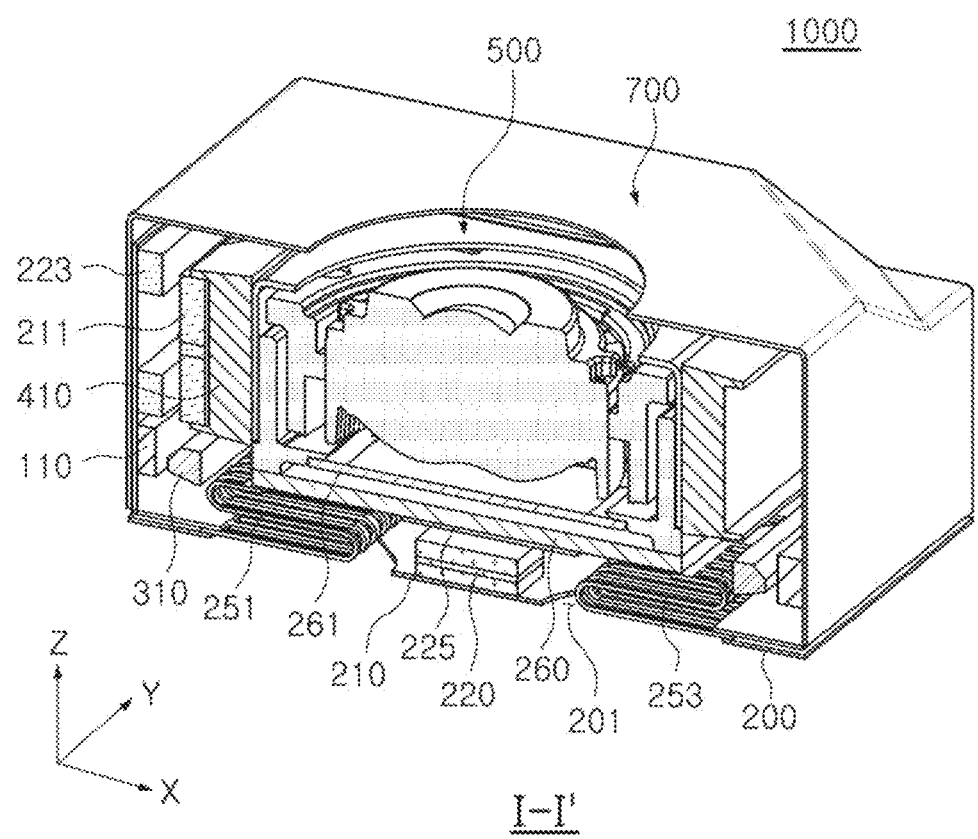
FIG. 3 is a cross-sectional perspective view, taken along line I-I' in FIG. 1, of the camera module of FIG. 1.
Figure 4:
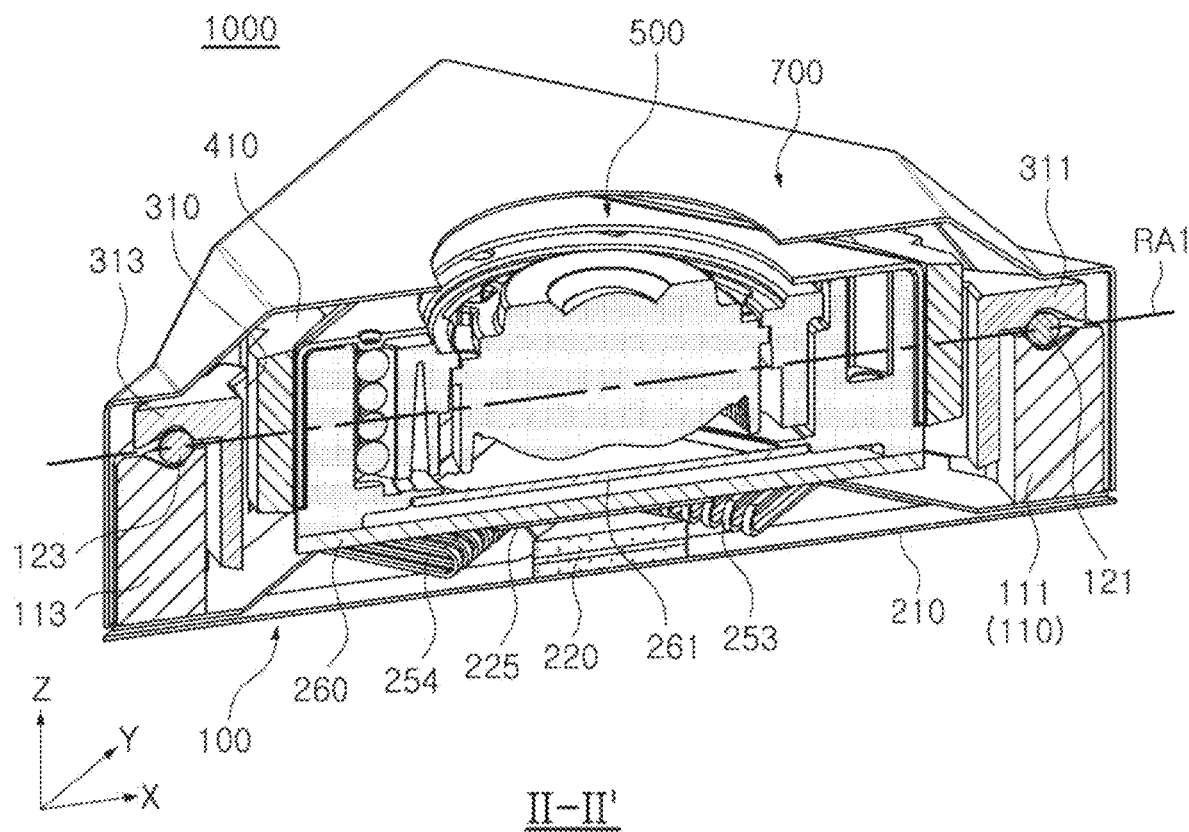
FIG. 4 is a cross-sectional perspective view, taken along line II-II' in FIG. 1, of the camera module of FIG. 1.
Figure 5:
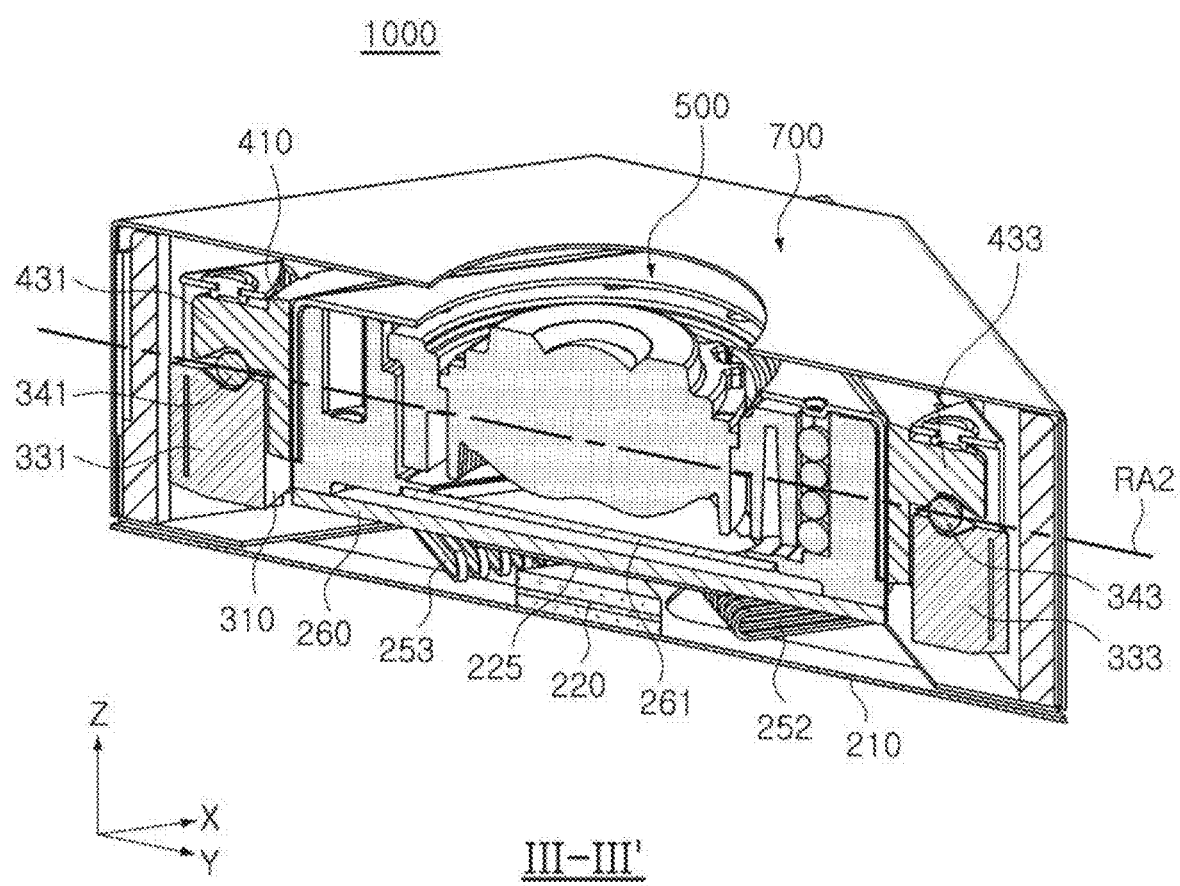
FIG. 5 is a cross-sectional perspective view, taken along line III-III' in FIG. 1, of the camera module of FIG. 1.
Figure 9:
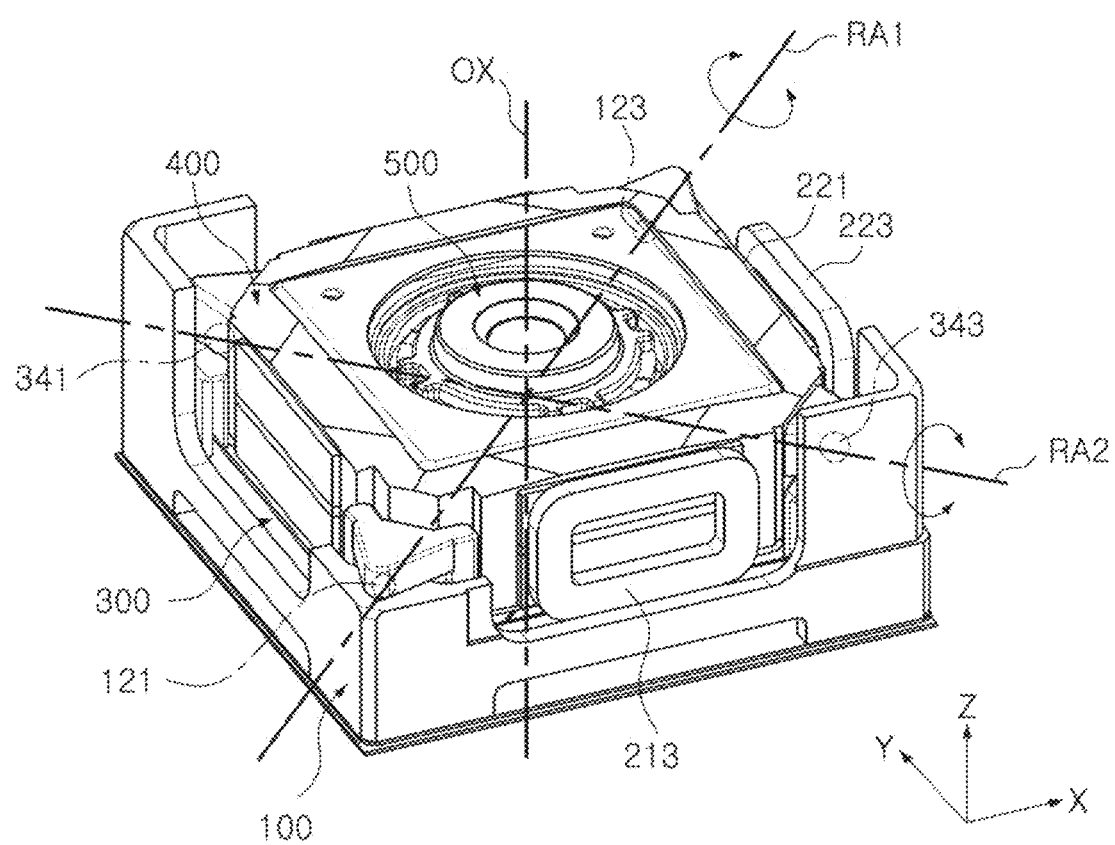
FIG. 9 is a reference diagram illustrating a shape in which a rotation module rotates about a first rotation axis and a second rotation axis in a camera module according to an example.
Figure 10:
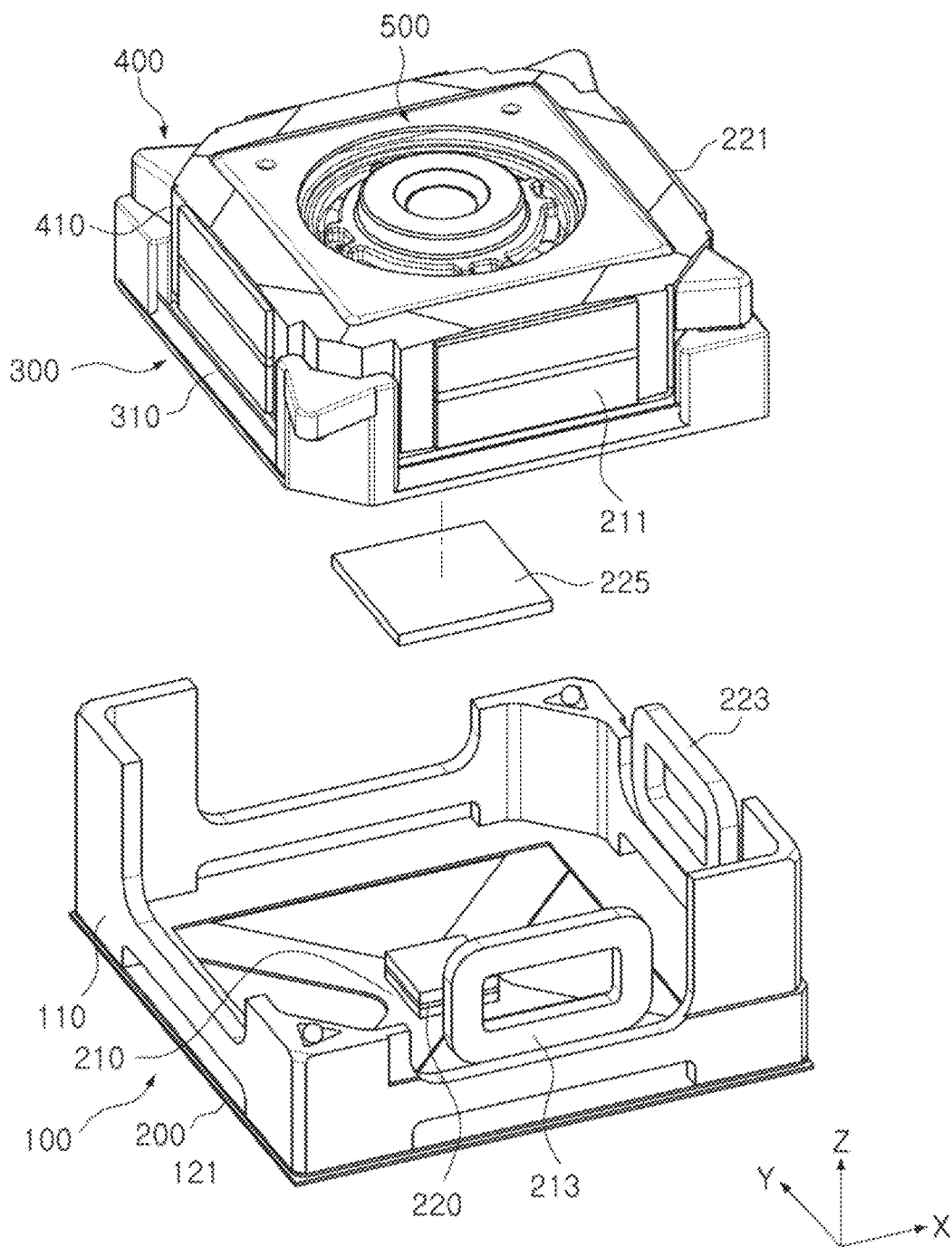
FIG. 10 is a reference diagram illustrating a structure in which force, attracting a rotation module to a housing, is applied by a first magnetic material and a second magnetic material in a camera module, according to an example.

FIG. 3 is a cross-sectional perspective view, taken along line I-I' in FIG. 1, of the camera module of FIG. 1. FIG. 4 a cross-sectional perspective view, taken along line II-II' in FIG. 1, of the camera module of FIG. 1. FIG. 5 is a cross-sectional perspective view, taken along line III-III' in FIG. 1, of the camera module of FIG. 1. FIG. 9 is a reference diagram illustrating a shape in which a rotation module rotates about a first rotation axis and a second rotation axis in a camera module, according to an example. FIG. 10 is a reference diagram illustrating a structure in which a rotating module applies attractive force to a housing by a first magnetic material and a second magnetic material in a camera module, according to an example.

In FIGS. 3 to 5 and FIGS. 9 and 10, the shake compensation module of the camera module 1000, according to this example, may include a housing 100, and a first frame 300 and a second frame 400 sequentially disposed inside of the housing 100 in an optical axis direction.

As illustrated in FIG. 9, a first rotation axis RA1 may be formed by at least two first ball members between opposing surfaces of the housing 100 and the first frame 300 in an optical axis direction, and a second rotation axis RA2 may be formed by at least two ball members between opposing surfaces of the first frame 300 and the second frame 400 in the optical axis direction. The at least two first ball members are disposed in a direction intersecting the optical axis direction, and the least two second ball members are disposed in a direction intersecting the optical axis direction and a first rotation axis direction.

The first frame 300 may rotate about the first rotation axis RA1 intersecting (or perpendicular to) an optical axis direction (a Z-axis direction).

The housing 100 may include first guides 110 (111 and 113) on the body, and the first frame 300 may include second guides 310 (311 and 313). Bearings, for example, first ball members 120 (121 and 123), may be disposed between the first guides 111 and 113 and the second guides 311 and 313. Since the bearing may be any bearing serving to guide a rotation, the bearing may have various shapes such as a spherical or cylindrical shape, a pointed-projection shape, a hemispherical shape, and the like.

The first guides 110 (111 and 113) and the second guides 310 (311 and 313) may each include two guides. Accordingly, the first ball members 120 (121 and 123) may also include two ball members. In addition, the first rotation axis RA1 may be an imaginary line interconnecting the two bearings 121 and 123, and the first frame 300 may rotate about the first rotation axis RA1.

In this example, the two first ball members 121 and 123 may be disposed in the direction of the first rotation axis RA1 perpendicular to an optical axis (a Z-axis). For example, assuming that the housing 100, according to this example, has a substantially rectangular box shape and X-axis and Y-axis directions, perpendicular to the optical axis, is parallel to a direction of a side forming the housing 100, the first ball members 121 and 123 may be disposed on corners of a rectangle having an X-axis and a Y-axis as sides. Therefore, the first rotation axis RA1 may be formed in a diagonal direction of the rectangle.

For example, the housing 100 has a body 110 having a rectangular box shape, and the body 110 may be hollow in the optical axis direction. In addition, the first guides 111 and 113 may be disposed on a corner portion of the body 110 such that the two first ball members 121 and 123 are diagonally disposed. The first guides 111 and 113 may upwardly protrude in the optical axis direction.

For example, the first frame 300 has a body 310 having a rectangular frame shape, and the body 310 may be hollow in the optical axis direction. In addition, two second guides 311 and 313 may be disposed on a corner portion of the body 310 to oppose the first guides 111 and 113 such that the two first ball members 121 and 123 are diagonally disposed.

The first guides 111 and 113 and the second guides 311 and 313 may include guide grooves, respectively, such that the first ball members 121 and 123 are interpolated on an opposing surface in the optical axis direction to be fixed or to be prevented from being separated.

The second frame 400 may rotate about the second rotation axis RA2, intersecting or perpendicular to the optical axis (the Z-axis) and intersecting or perpendicular to the first rotation axis RA1. The intersection of the first rotation axis RA1 and the second rotation axis RA2 may meet the optical axis, and the first rotation axis RA1 and the second rotation axis RA2 may vertically intersect each other. In addition, the first rotation axis RA1 and the second rotation axis RA2 may be parallel to a direction perpendicular to the optical axis and may be disposed in substantially the same position in the optical axis direction.

The first frame 300 may include third guides 330 (331 and 333) on the body 310, and the second frame 400 may include fourth guides 430 (431 and 433). Bearings, for example, second ball members 340 (341 and 343), may be disposed between the third guides 331 and 333 and the fourth guides 431 and 433. Since the bearing may be any bearing serving to guide a rotation, the bearing may have various shapes such as a spherical or cylindrical shape, a pointed-projection shape, a hemispherical shape, and the like.

The first ball members 121 and 123 and the second ball members 341 and 343 may be disposed to rotate in the same positions thereof or to be maintained in a fixed state.

The third guides 330 (331 and 333), and the fourth guides 430 (431 and 433) may each include two guides. Accordingly, the second ball member 320 (321 and 323) may also include two ball members. In addition, the second rotation axis RA2 may be an imaginary line connecting two bearings 341 and 343, and the second frame 400 may rotate about the second rotation axis RA2.

In this example, the two second ball members 341 and 343 may be disposed in the direction of the second rotation axis RA2 perpendicular to the optical axis (the Z-axis) and intersecting (or perpendicular to) the first rotation axis RA1. For example, assuming that the first frame 300 according to this example has a substantially rectangular shape and the X-axis and Y-axis directions perpendicular to the optical axis are parallel to a direction of a side forming the first frame 300, the second ball members 341 and 343 may be disposed on corners of a rectangle having an X-axis and a Y-axis as sides. Accordingly, the second rotation axis RA2 may be formed in a diagonal direction of the rectangle.

For example, the first frame 300 may have a body 310 having a rectangular box shape, and the body 310 may be hollow in the optical axis direction. In addition, third guides 331 and 333 may be disposed on corner portions of the body 310 such that the two second ball members 341 and 343 are diagonally disposed. The third guides 331 and 333 may protrude upwardly in the optical axis direction.

For example, the second frame 400 may have a body 410 having a rectangular frame shape, and the body 410 may be hollow in the optical axis direction. In addition, two fourth guides 431 and 433 may be disposed on the corner portion of the body 410 to oppose the third guides 331 and 333 such that the second ball members 341 and 343 are diagonally disposed.

The third guides 331 and 333, and the fourth guides 431 and 433 may include guide grooves, respectively, such that the second ball members 341 and 343 are interpolated on an opposing surface in the optical axis direction to fix positions thereof or to be prevented from being separated.

As described above, the first frame 300, according to this example, may rotate relative to the housing 100 about the first rotation axis RA1, and the second frame 400 may rotate relative to the first frame 300 about the second rotation axis RA2. In addition, since the second frame 400 is supported by the first frame 300, the second frame 400 may rotate together when the first frame 300 rotates relative to the housing 100.

FIG. 10 illustrates the principle that force, attracting a rotation module to a housing, is applied by a first magnetic material and a second magnetic material in a camera module according to an example.

For example, the first frame 300 and the second frame 400 are sequentially placed on the housing 100, respectively, with the first ball members 121 and 123 and the second ball members 341 and 343 interposed therebetween. Therefore, when such a structure is subjected to an impact or is shaken, a gap may be formed in the optical axis direction to separate the first and second frames 300 and 400 from each other.

Accordingly, the first magnetic material 220 and the second magnetic material 225 are selectively disposed below the second frame 400, disposed on an uppermost portion in the optical axis direction, and on a bottom surface of the housing 100 to prevent such a separation. Magnetic force, attracting the second frame 400 to the housing 100, may be generated by the first magnetic material 220 and the second magnetic material 225. Thus, the first frame 300 may be attracted to the housing 100, and the second frame 400 may be attracted to the first frame 300.

The first magnetic material 220 and the second magnetic material 225 may be disposed to oppose each other in the optical axis direction.

The first magnetic material 220 or the second magnetic material 225 is a magnetic material and may be a material magnetized in a magnetic field (including both a metallic material and a non-metallic material). The first magnetic material 220 or the second magnetic material 225 may be an attractive magnet or an attractive yoke.

For example, when the first magnetic material 220 is an attractive magnet, the second magnetic material 225 may be an attractive yoke or an attractive magnet. In addition, when the first magnetic material 220 is an attractive yoke, the second magnetic material 225 may be an attractive magnet. Hereinafter, for convenience of description, a description will be given of an example in which the attractive magnet 220 is disposed in the housing 100, and the attractive yoke 225 is disposed in the second frame 400.

Since the second frame 400 is attracted to the housing 100 by the attractive force of the attractive yoke 225 and the attractive magnet 220, the first frame 300 or the second frame 400 may be prevented from being separated.

In addition, in this example, the attractive yoke 225 and the attractive magnet 220 may be disposed such that even when power is not applied, the lens module 500 is fixed to a predetermined position by attractive forces of the attractive yoke 225 and the attractive magnet 220 to level off.

Accordingly, the first magnetic material 220 and the second magnetic material 225 may be disposed along the optical axis. More specifically, the first magnetic material 220 and the second magnetic material 225 may be disposed at regular intervals along the optical axis and may be disposed below an intersection of the first rotation axis RA1 and the second rotation axis RA2. The optical axis may refer to an actual optical axis (OX in FIG. 9), for example, a line connecting centers of a plurality of lenses formed in a state in which they are stacked in the optical axis direction.

In this example, for ease of description, a description will be given of a structure in which the attractive yoke 225 is disposed below the second frame 400, and the attractive magnet 220 is disposed on the bottom surface of the housing 100.

The attractive yoke 225 may be mounted on a lower portion of the second frame 400, in detail, on a lower surface of a sensor substrate 260, disposed on the bottom surface of the lens module 500, in the optical axis direction.

The attractive magnet 220 may be mounted to be disposed in a hollow portion of the main substrate 200 mounted in the housing 100.

For example, a separate auxiliary substrate 210, fixed to an internal edge of a lower surface of the main substrate 200 in the optical axis direction or extending to the optical axis OX from the internal edge, may be disposed in the hollow portion of the main substrate 200. In addition, the attractive magnet 220 may be disposed in a position opposing the attractive yoke 225 on an upper surface of the auxiliary substrate 210 in the optical axis direction.

Figure 11:
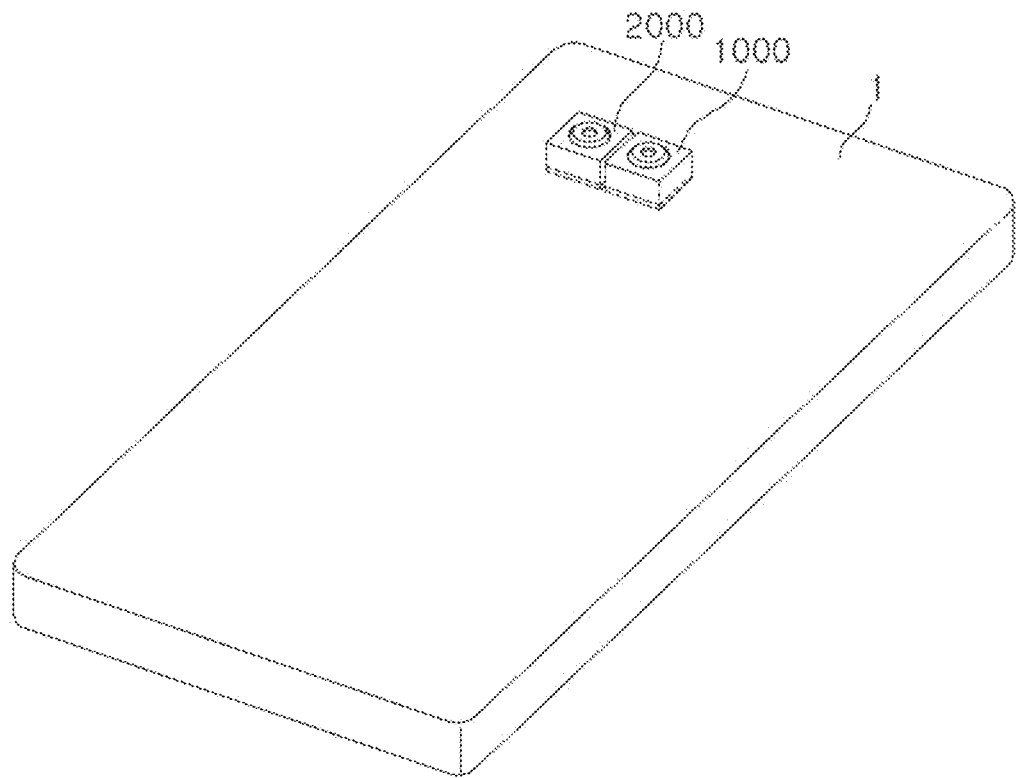
FIG. 11 is a perspective view of a portable electronic device according to an example.

Alternatively, the attractive magnet 220 may be mounted in a device in which the camera module 1000, for example, a portable terminal (an electronic device) illustrated in FIG. 11 is mounted. For example, the main substrate 200 of the camera module 1000 may have a hollow portion 201, and the camera module 1000 may first be mounted in the device such that the attractive magnet 220 is exposed to oppose the attractive yoke 225.

In this example, an auxiliary member 600 may be disposed between a cover 700 and the second frame 400. The auxiliary member 600 may include a stopper, a damper, a buffer member, and the like. In addition, the auxiliary member 600 may be disposed to cover the fourth guide 431 from above.

In this example, a shake compensation driving portion may be provided. The shake compensation driving portion may provide a driving force to rotate the first frame 300 and the second frame 400.

The shake compensation driving portion may be implemented by coils 213 and 223 and magnets 211 and 221 selectively disposed in the housing 100 and the second frame 400. The shake compensation driving portion should provide driving force such that the first frame 300 and the second frame 400 rotate about the first rotation axis RA1 and the second rotation axis RA2, respectively. Therefore, two sets of shake compensation driving portions, each including a coil and a magnet, may be provided.

In this example, the two magnets 211 and 221 are disposed on a side surface of the second frame 400, and the two coils 213 and 223 are disposed on a side surface of the housing 100 to respectively oppose the two magnets 211 and 221. However, the present disclosure is not limited to such a structure, and two coils may be disposed on the side surface of the second frame 400, and two magnets may be disposed on the housing 100.

In the latter case in which the two magnets are disposed on the side surface of the housing 100, a yoke may be disposed to cover an external surface of the housing 100, which leads to an additional effect that a magnetic field generated in the shake compensation driving portion may be prevented from leaking out. In such a structure, there is no effect of leakage of a magnetic field on another camera module even when a camera module is mounted to be adjacent to another camera module. Therefore, when a plurality of cameras is mounted to be adjacent to a single device, the degree of freedom may be significantly increased.

Although it will be described below, in this example, the image sensor 261 rotates together with the second frame 400, and an autofocusing module is disposed in the second frame 400, so that additional power and signal lines should be connected to a sensor substrate 260 disposed in the second frame 400. Therefore, a shake compensation driving coil may be somewhat easily disposed in the second frame 400.

The shake compensation driving portion of this example may continuously sense positions of the first frame 300 and the second frame 400 to be for driving control. To perform such position sensing, position detection sensors 215 and 226 may be disposed to oppose the two magnets 211 and 221, respectively. Each of the position detection sensors 215 and 226 may be a Hall sensor.

The coils 213 and 223 and the position detection sensor 215 and 226 may be fixed to the housing 100 in a state in which they are mounted on the coil substrates 231 and 233, respectively. Each of the coil substrates 231 and 233 may be connected to the main substrate 200 coupled to the housing 100. In detail, the coil substrates 231 and 233 may be connected to coil substrate connection terminals 202 and 203 of the main substrate 200, respectively.

Each of the coil substrates 231 and 233, or the main substrate 200 may be a flexible substrate or a rigid substrate.

The coil substrates 231 and 233 and the main substrate 200 may be integrally formed or separately disposed and then connected to each other by a terminal, or the like.

The main substrate 200 of this example may be coupled to a bottom surface of the housing 100 and may have a hollow portion 201 in the optical axis direction.

Coil substrates 231 and 233, supplying power and a signal to a shake compensation coil, and connection substrates 251, 252, 253, and 254, supplying power and a signal to autofocusing coil and an image sensor 260, may be connected to the main substrate 200.

Additionally, referring to FIGS. 3 to 5, the lens module 500 of the camera module 1000 according to this example may be disposed in the second frame 400.

The lens module 500 includes a lens barrel, in which a plurality of lenses is stacked in the optical axis direction, and an autofocusing module allowing the lens barrel to be moved in the optical axis direction.

In addition, the lens module 500 is disposed in the second frame 400 to rotate together when the second frame 400 rotates about the first rotation axis RA1 and the second rotation axis RA2. Accordingly, since an optical axis of the lens module 500 moves together to correspond to the rotation of the second frame 400, the optical axis OX of the lens module 500 may also rotate (move). Therefore, the lens module 500 includes an image sensor 261 in which light passing through a plurality of lenses of the lens barrel is formed as an image or an image. For example, the second frame 400 includes an image sensor 261 together with the lens module 500.

As a result, the lens module 500 includes an autofocusing module and an image sensor, so the camera module 1000 of this example requires a flexible connection line (a flexible substrate) that may supply power and a signal to the lens module 500, a rotating (moving) member. In addition, the connection line may be disposed to have sufficient flexibility so as not to be disconnected or separated, even by a rotating motion of the lens module 500 mounted in the second frame 400.

Figure 6:
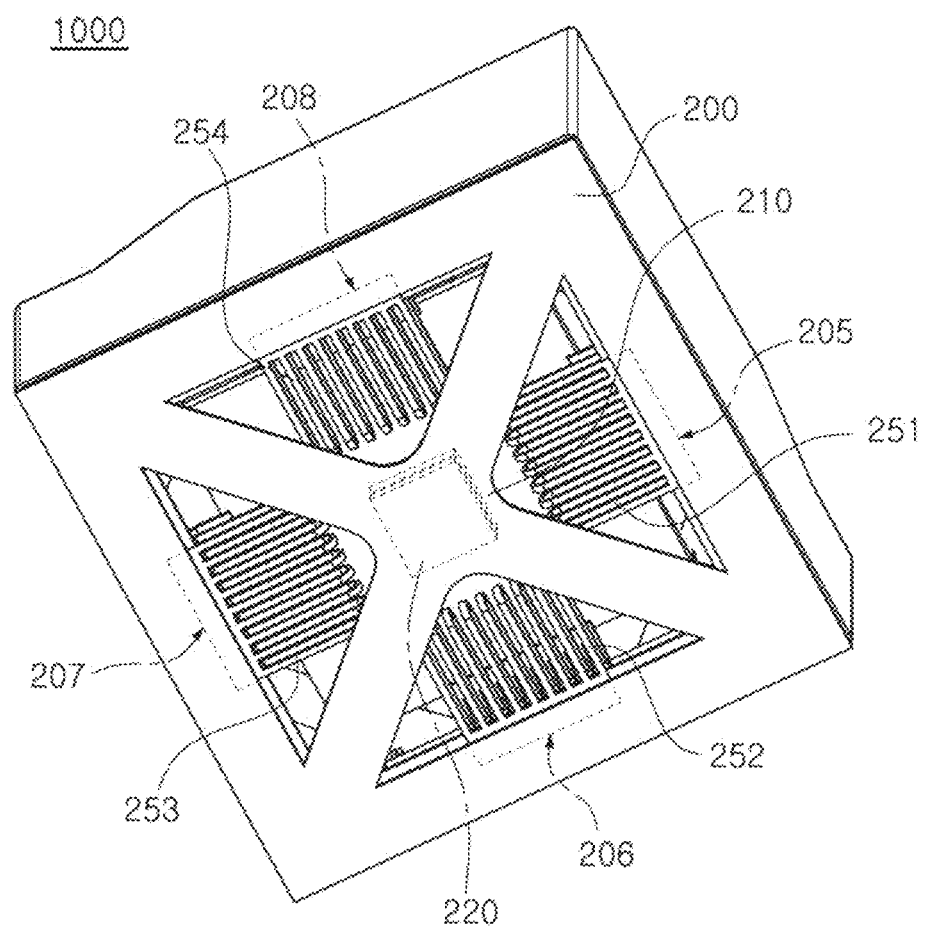
FIG. 6 is a bottom projection view of the camera module according to an example (in which an auxiliary substrate is transparently illustrated).

FIG. 6 is a bottom projection view of the camera module, according to an example (in which an auxiliary substrate is transparently illustrated). FIGS. 7A to 7H are reference diagrams illustrating connection substrates having various structures that may be disposed on a sensor substrate according to an example. FIG. 8 is a plan view of a main substrate, according to an example.

Additionally, referring to FIGS. 6 to 8, the connection substrates 251, 252, 253, and 254 of the camera module 100 of this example will be described in further detail.

The lens module 500 includes a sensor substrate 260 on which the image sensor 261 is mounted. A coil substrate, supplying power to a coil for autofocusing of the lens module 500, may be connected to the sensor substrate 260.

The sensor substrate 260 may be connected to the main substrate 200 of the camera module 1000 through a connection substrate. The connection substrate may be a flexible substrate (FPC). For example, the connection substrates 251, 252, 253, and 254 may be disposed to have a plurality of strands by separating at least some signal lines or power lines. Therefore, since each line is divided into a plurality of strands, bending may be easily performed to sufficiently implement the movement of the second frame 400.

It is a matter of course that even when the connection substrates 251, 252, 253, and 254 are separately disposed, terminals are disposed on both end portions thereof to connect some of the connection substrates 251, 252, 253, and 25 to the sensor substrate 260 and to connect the other connection substrates to the main substrate 200. Alternatively, some of the connection substrates 251, 252, 253, and 254 may be integrated with the sensor substrate 260, and only the other connection substrates may include a terminal to be connected to the main substrate 200 later. When the connection substrates 251, 252, 253, and 254 are integrated with the sensor substrate 260, the connection substrates 251, 252, 253, and 254 may be disposed in a stacked structure provided according to a semiconductor manufacturing process together with the sensor substrate 260.

The connection substrate 251, 252, 253, and 254 may be divided into four connection substrates. For example, one end portion may be connected to each of the four sides of a rectangular sensor substrate 260. After the connection substrates 251, 252, 253, and 254 divided into four connection substrate may be bent several times, each of the other end portions of the bent connection substrates 251, 252, 253, and 254 may be connected to the main substrate 200. Since the connection substrates 251, 252, 253, and 254 are divided into four connection substrates and respectively connected to four sides of the sensor substrate 260, bending may be easily performed to sufficiently implement the movement of the second frame 400.

More specifically, after the connection substrate 251, 252, 253, and 254 divided into four connection substrates are bent several times, for example, the other end portions of the bent connection substrate 251, 252, 253, and 254 may be connected to a lower surface of the main substrate 200 in the optical axis direction through a hollow portion 201 having a rectangular shape. Accordingly, connection substrate connection terminal 205, 206, 207, and 208 may be disposed on the lower surface of the main substrate 200 along the edge of the hollow portion 201 in the optical axis direction. The connection substrate connection terminals 205, 206, 207, and 208 may be disposed, one on each of the sides forming a rectangular hollow portion 201.

Coil substrate connection terminals 202 and 203 may be disposed on an upper surface of the main substrate 200 in the optical axis direction along an edge of the upper surface.

FIGS. 7A to 7H illustrate structures in which connection substrates, according to various examples, are each disposed on a sensor substrate. In this example, the connection substrate may have sufficient durability and may have a structure capable of significantly reduce deformation or damage even when it is repeatedly used.

Figure 7A:
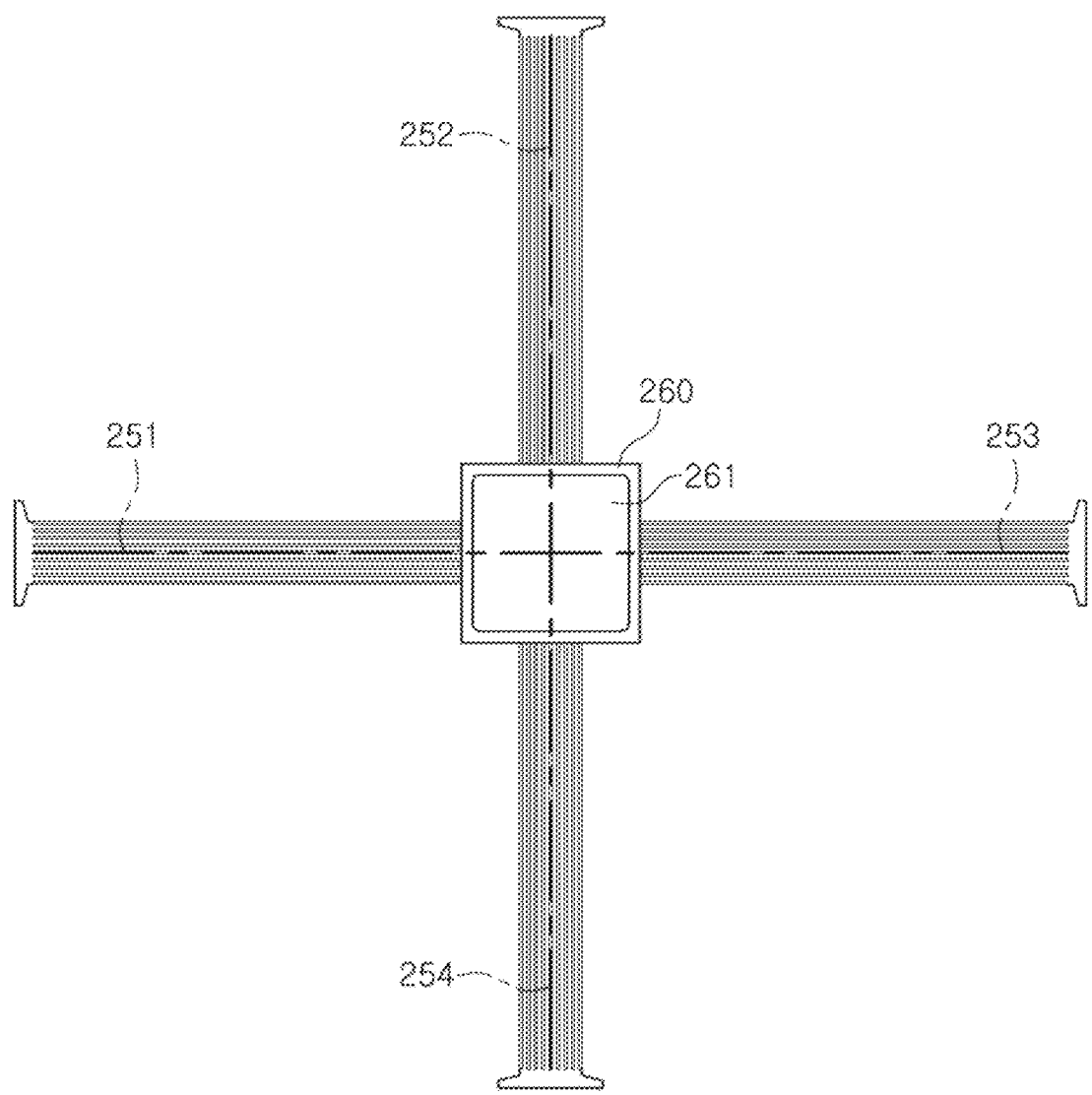
FIGS. 7A to 7H are reference diagrams illustrating connection substrates having various structures that may be disposed on a sensor substrate, according to an example.
Figure 7B:
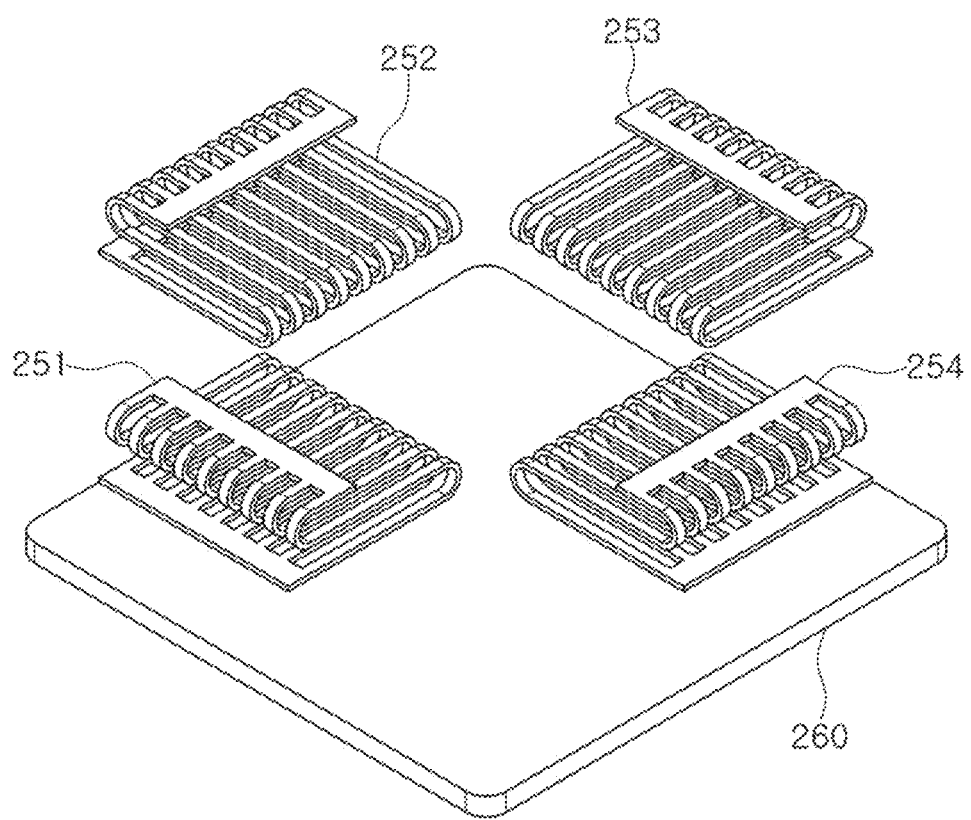
Figure 8:
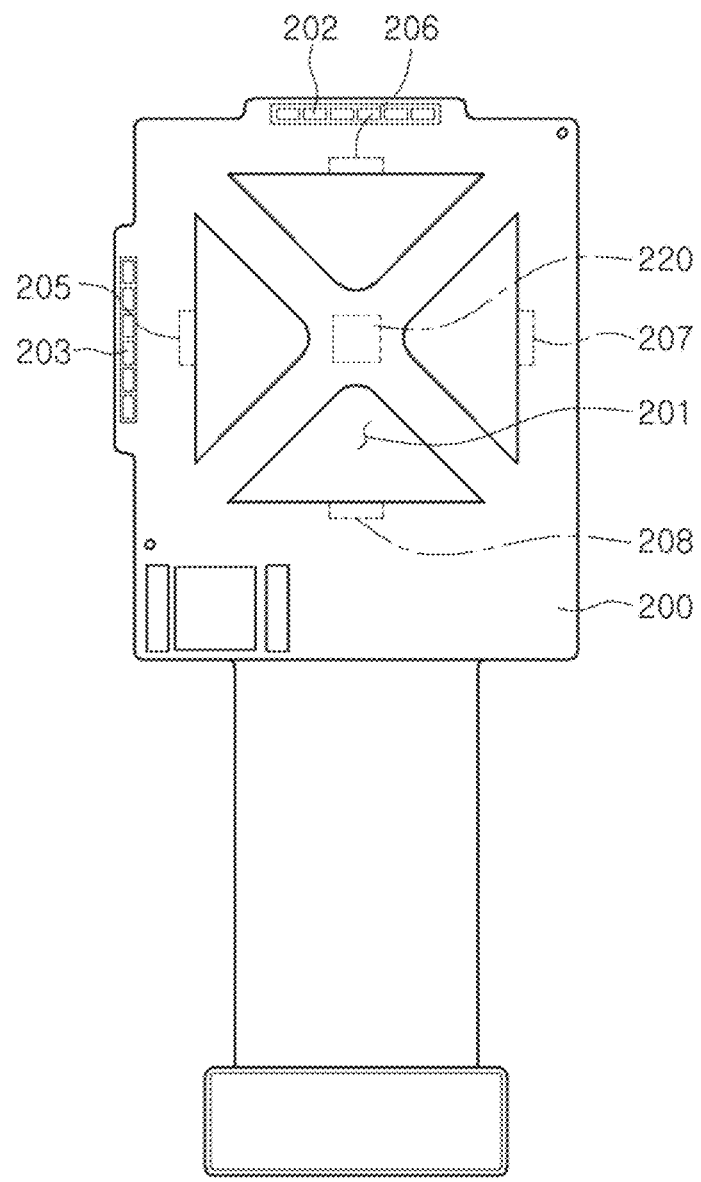
FIG. 8 is a plan view of a main substrate according to an example.

Referring to FIGS. 7A and 7B, connection substrates 251, 252, 253, and 254, according to an example, may be disposed, one on each side of a rectangular sensor substrate 260. In this case, a power line or a control line of each of connection substrates 251, 252, 253, and 254 may branch into at least two power lines or control lines. Each of the connection substrate 251, 252, 253, and 254 may be coupled to an upper or lower surface of the sensor substrate 260 by various methods such as soldering and adhesion using a conductive adhesive, or each of the connection substrates 251, 252, 253, 254 may be integrated with a sensor substrate 260. When the connection substrates 251, 252, 253, and 254 are integrally disposed with the sensor substrate 260. When the connection substrates 251, 252, 253, and 254 may be integrated with the sensor substrate 260, they may be disposed in a stacked structure provided according to a semiconductor manufacturing process together with the sensor substrate 260, and the connection substrates 251, 252, 253, and 254 may extend from a side surface of the sensor substrate 260.

Figure 7C:
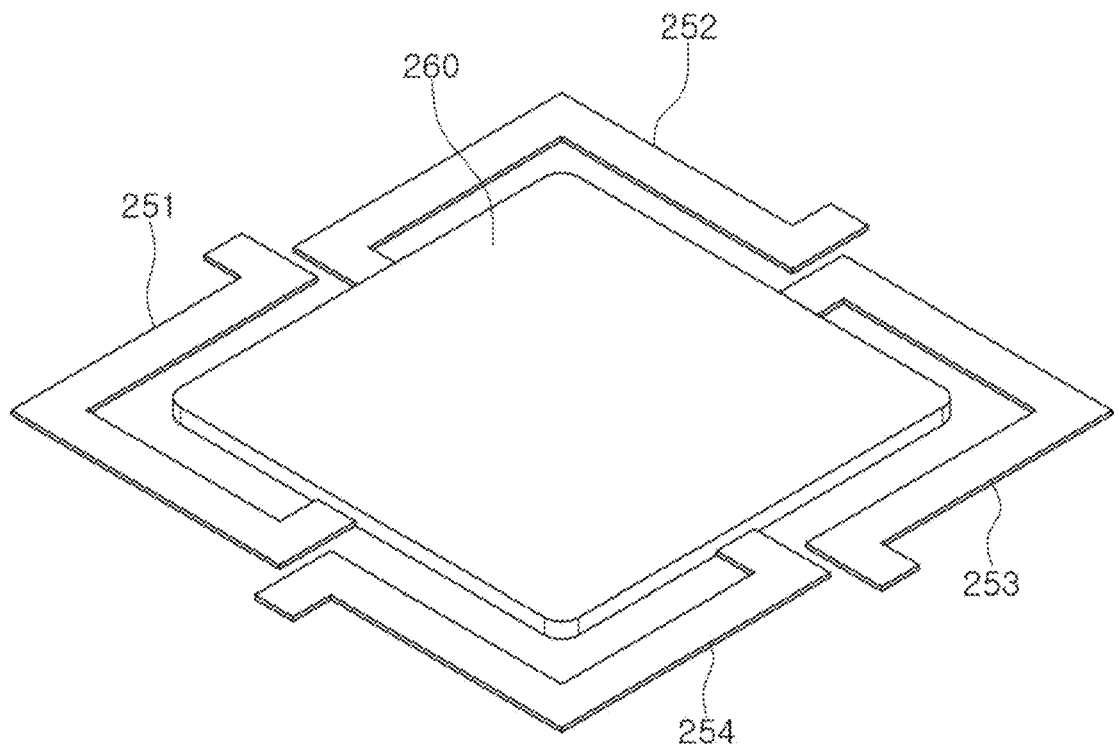
Figure 7D:
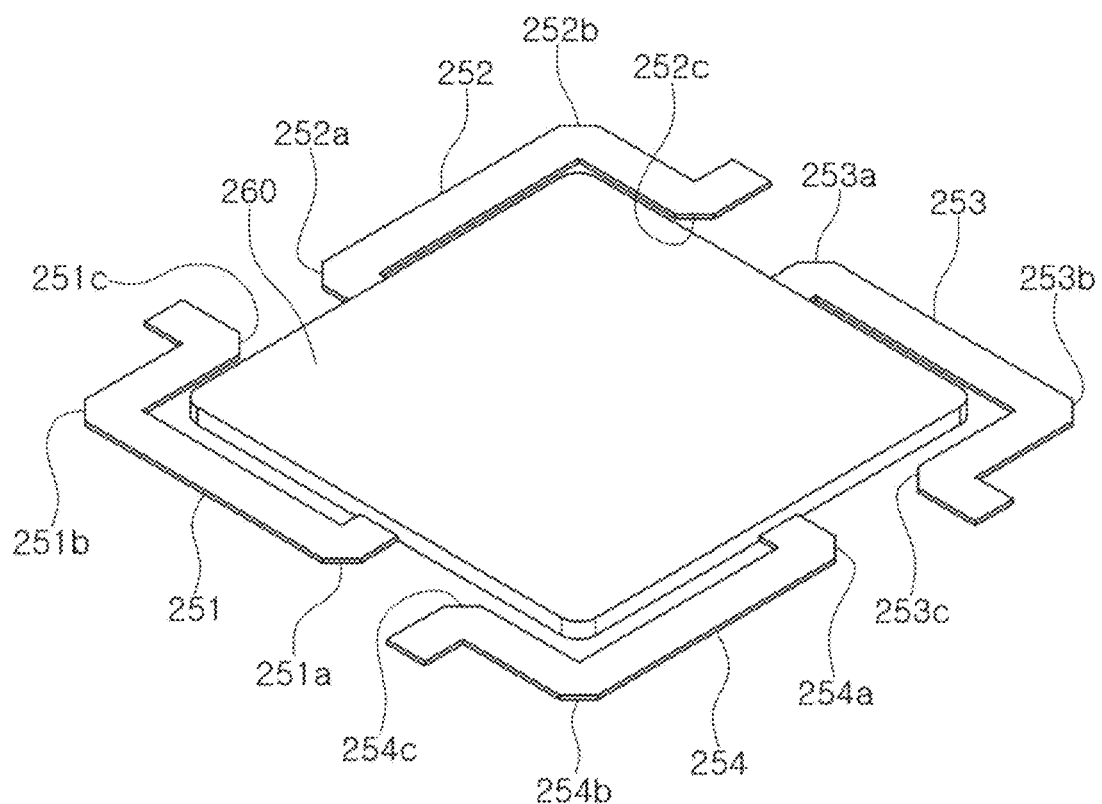
Figure 7E:
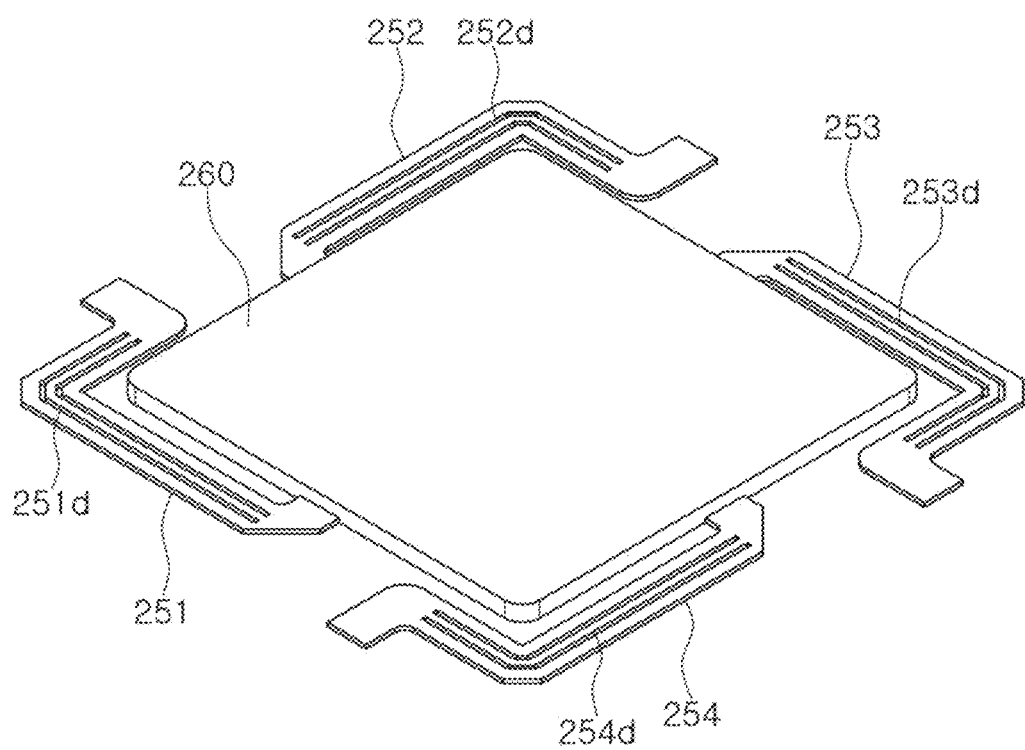

Referring to FIGS. 7C to 7E, connection substrates 251, 252, 253, and 254, according to an example, may be disposed, one on each side of a rectangular sensor substrate 260. In addition, the connection substrates 251, 252, 253, and 254 may be integrally coupled to the sensor substrate 260 (a semiconductor process, or the like) or may be separately manufactured and then coupled by various methods such as mutual soldering, adhesion using a conductive adhesive, and the like.

Referring to FIG. 7C, connection substrates 251, 252, 253, and 254, respectively sides of a sensor substrate 260, may be provided to have a bent shape as if covering an edge of the sensor substrate 260. Referring to FIG. 7D, each of the connection substrates 251, 252, 253, and 254 may include one or more chamfered portions 251a, 251b, 251c, 252a, 252b, 252c, 253a, 253b, 253c, 254a, 254b, and 254c provided to have a shape in which a bent portion is cut.

Referring to FIG. 7E, each of the connection substrate 251, 252, 253, and 254 may include one or more cutting-type slits 251d, 252d, 253d, and 254d disposed to extend in a length direction.

Figure 7F:
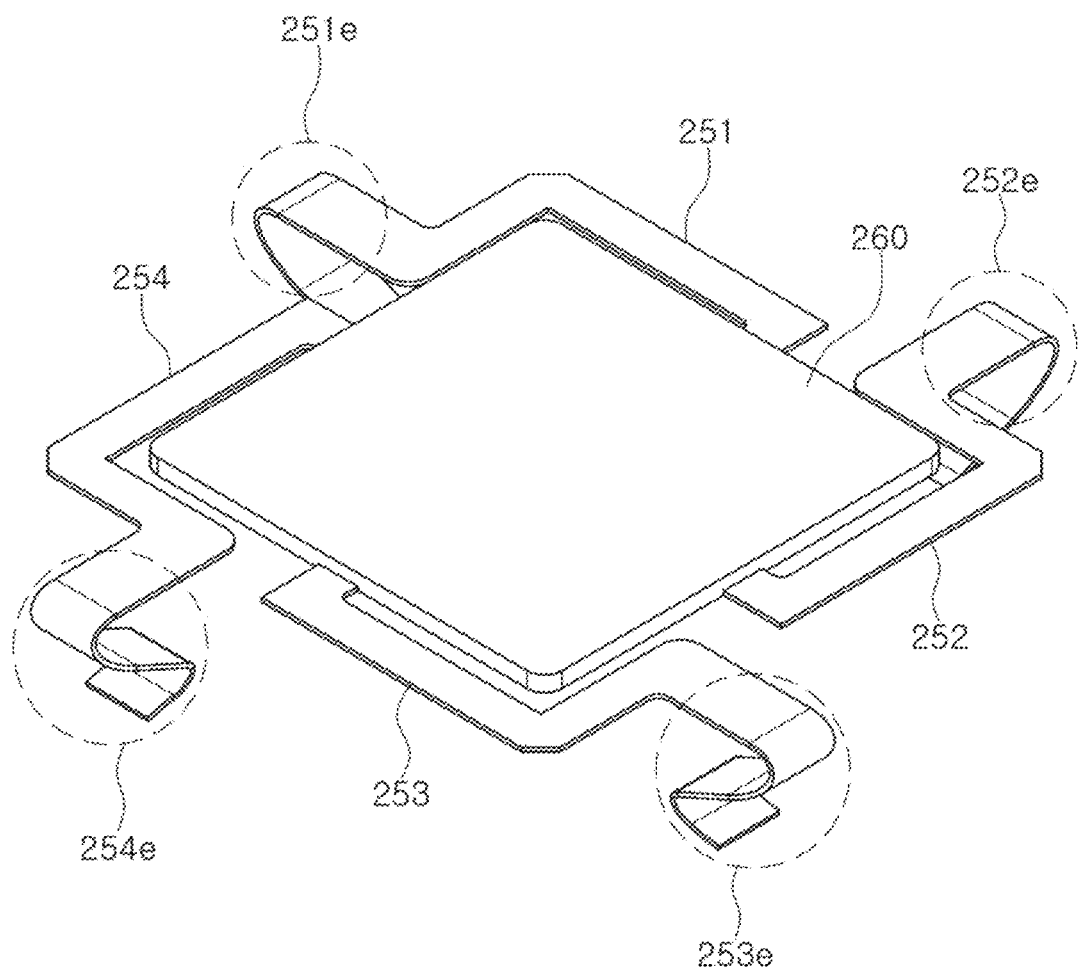
Figure 7G:
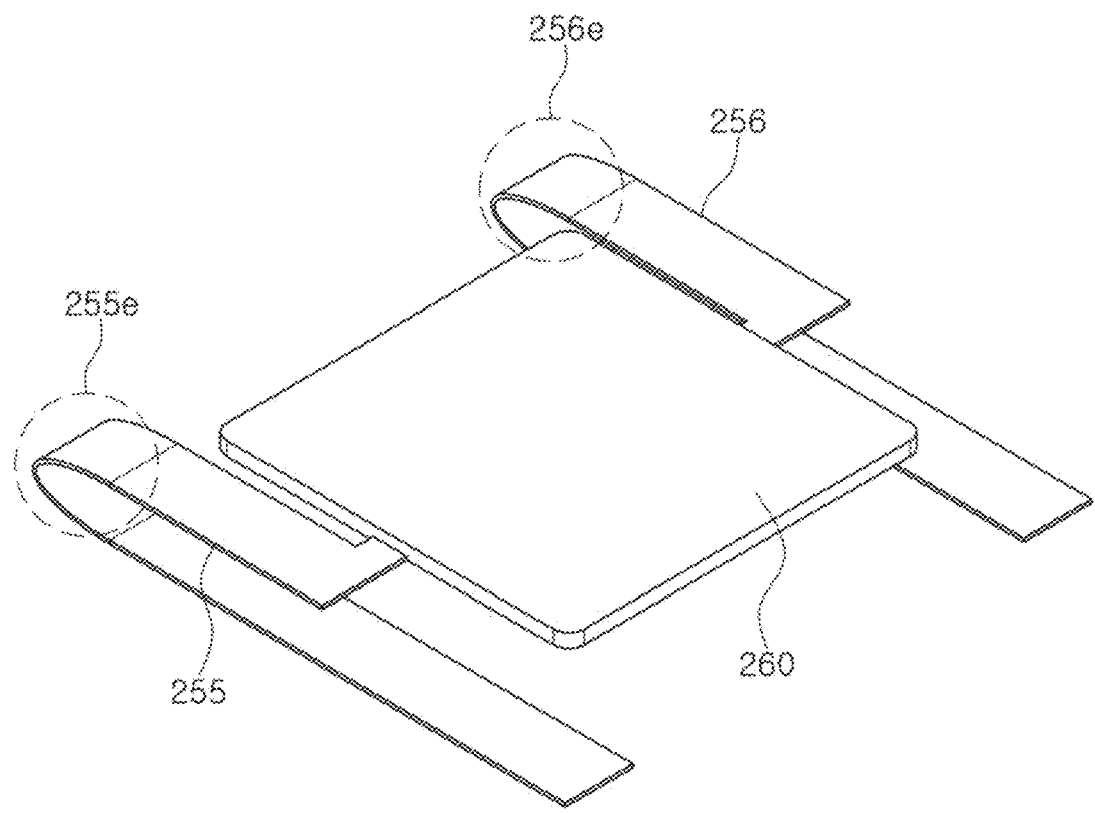
Figure 7H:
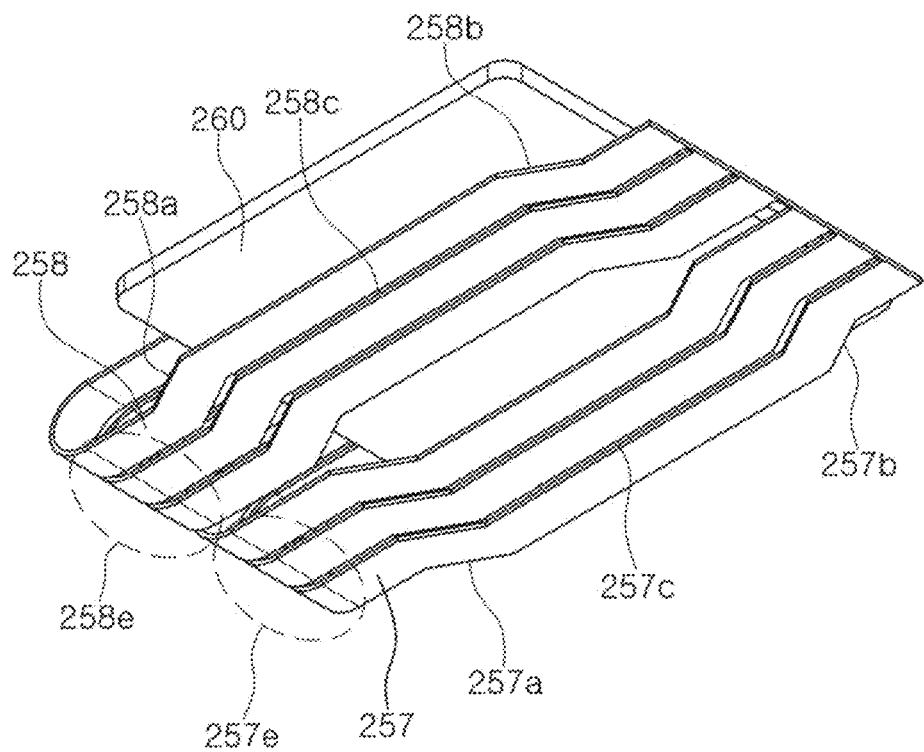

FIG. 7F to 7H illustrate structures in which a connection substrate according to an example is provided with a bent portion in a center thereof such that the other terminal portion is disposed on a plane different from a plane on which a sensor substrate is disposed. Each connection substrate may be integrally coupled to the sensor substrate 260 (a semiconductor process, or the like) or separately manufactured and then coupled by various methods such as mutual soldering, adhesion using a conductive adhesive, and the like.

Referring to FIG. 7F, connection substrates 251, 252, 253, and 254 may be disposed, one on each side of a rectangular sensor substrate 260. The connection substrates 251, 252, 253, and 254, respectively, disposed on sides of the sensor substrate 260, may be provided to have a bent shape as if covering an edge of the sensor substrate 260.

The connection substrate 251, 252, 253, 254 may include bent portions 251e, 252e, 253e, and 254e, each having a center portion bent at least one time, such that end portions of the connection substrate 251, 252, 253, and 254, opposing a side connected to the sensor substrate 260 are disposed on a plane different from a plane on which the sensor substrate 260 is disposed.

Referring to FIG. 7G, connection substrates 255 and 256 may be disposed, one on each of opposing sides of a rectangular sensor substrate 260. The connection substrate 255 and 256 may include bent portions 255e and 256e, each having a center portion bent at least one time, such that end portions of the connection substrate 255 and 256, opposing a side connected to the sensor substrate 260 are disposed on a plane different from a plane on which the sensor substrate 260 is disposed. In this case, there may be no overlapping portion between the sensor substrate 260 and the connection substrates 255 and 256 in the optical axis direction.

Referring to FIG. 7H, connection substrate 257, and 258 may be disposed together on the same side of a rectangular sensor substrate 260. The connection substrate 257 and 258 may include bent portions 257e and 258e, each having a center portion bent at least one time, such that end portions of the connection substrate 257 and 258, opposing a side connected to the sensor substrate 260 are disposed on a plane different from a plane on which the sensor substrate 260 is disposed. In this case, the connection substrates 257 and 258 may be bent to a lower surface of the sensor substrate 260 such that the sensor substrate 260 and the connection substrates 257 and 258 overlap in an optical axis direction. In addition, one or more folded portions 257a, 257b, 258a, and 258, folded in a direction perpendicular to an optical axis, may be proved on the connection substrates 257 and 258. In addition, the connection substrates 257 and 258 may include one or more slits 257c and 258c formed in a length direction.

FIG. 11 is a perspective view of a portable electronic device, according to an example. A portable electronic device 1 may be, for example, a mobile communications terminal, a smartphone, a tablet PC, or the like.

As illustrated in FIG. 11, a portable electronic device 1 may be equipped with a plurality of camera modules to capture a subject. For example, the portable electronic device 1 may include a first camera module 1000 and a second camera module 2000.

The first camera module 1000 and the second camera module 2000 have different fields of view, in an example. For example, one of the first and second camera modules 1000 and 2000 includes a telephoto camera, and the other includes a wide-angle camera. The first camera module 1000 may be configured to have a relatively narrow field of view (for example, telephoto), and the second camera module 2000 may be configured to have a relatively wide field of view (for example, wide-angle). Alternatively, the first camera module 1000 may be a wide-angle camera, and the second camera module 2000 may be a telephoto camera.

As described above, the two camera modules 1000 and 2000 are designed to have different fields of view, and thus, an image of a subject may be captured at various depths.

Accordingly, the camera module 1000, according to this example, may implement shake compensation based on a structure rotating about two axes, and may constantly maintain a focus because the image sensor rotates together with the rotating lens module 500. In addition, each signal line and each power line of the lens module 500 may be separated to have a plurality of strands and may branch into four lines to be sufficiently implemented to have no effect on rotation driving of the lens module 500.

Figure 12:
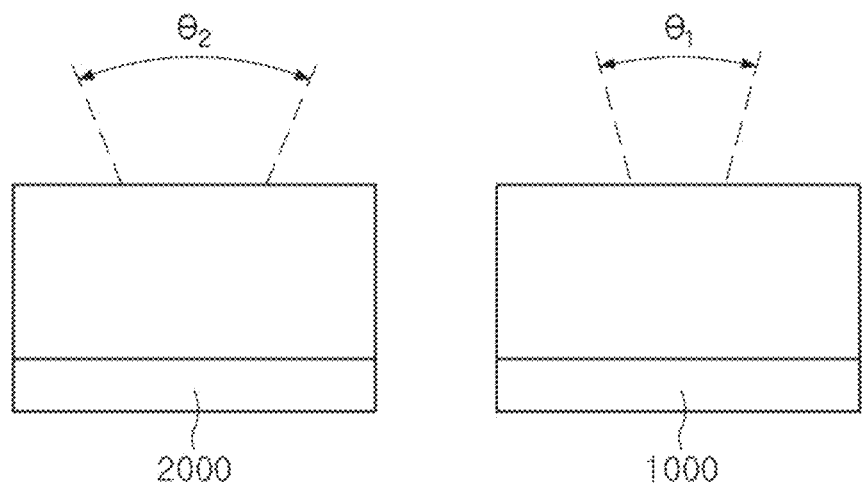
FIG. 12 is a reference diagram illustrating fields of view of a plurality of camera modules mounted in a portable electronic device according to an example.

As illustrated in FIG. 12, the first camera module 1000 and the second camera module 2000 may be configured to have different fields of view.

In an example, the first camera module 1000 is configured to have a relatively narrow field of view (for example, a telephoto camera), and the second camera module 2000 is configured to have a relatively wide angle of view (for example, a wide-angle camera). The first camera module 1000 may correspond to the camera module described with reference to FIGS. 1 to 8.

For example, the field of view θ1 of the first camera module 1000 may be formed within a range of 9 to 35 degrees, and the field of view θ2 of the second camera module 2000 may be formed within a range of 60 to 120 degrees.

As described above, the two camera modules 1000 and 2000 are designed to have different fields of view, and thus, an image of a subject may be captured at various depths.

The portable electronic device 1, according to an example, may include a picture-in-picture (PIP) function.

As an example, the portable electronic device may display an image, captured by a camera module having a narrower field of view (for example, the first camera module 1000), in an image captured by a camera module having a wider field of view (for example, the second camera module 2000).

For example, a subject of interest may be captured at a narrow field of view (therefore, the subject of interest may be enlarged) and displayed in an image captured at a wide field of view.

Since the subject of interest may move when moving images are captured, a camera module having a narrower field of view (for example, the first camera module 1000) may include a reflection module rotating to capture an image of the moving subject of the interest. Accordingly, light incident on the first camera module 1000 may be reflected on the reflection member of the reflection module, and then incident on the lens module after an optical path is changed.

For example, the first camera module 1000 may rotatably move the reflection module to track the movement of the subject of interest.

As an example, the reflection module disposed in the first camera module 1000 may rotate about a first rotation axis RA1 and a second rotation axis RA2. Therefore, the first camera module 1000 may compensate for a shake that may occur during image capturing.

The first rotation axis may refer to an axis perpendicular to the optical axis (a Z-axis), and the second rotation axis may refer to an axis perpendicular to both the optical axis (the Z-axis) and a first rotation axis. The first rotation axis and the second rotation axis, rotation axes of the reflection module of the first camera module 1000, may intersect the optical axis (the Z-axis). The optical axis (the Z-axis), the first rotation axis, and the second rotation axis may meet approximately at a certain point.

Figure 13:
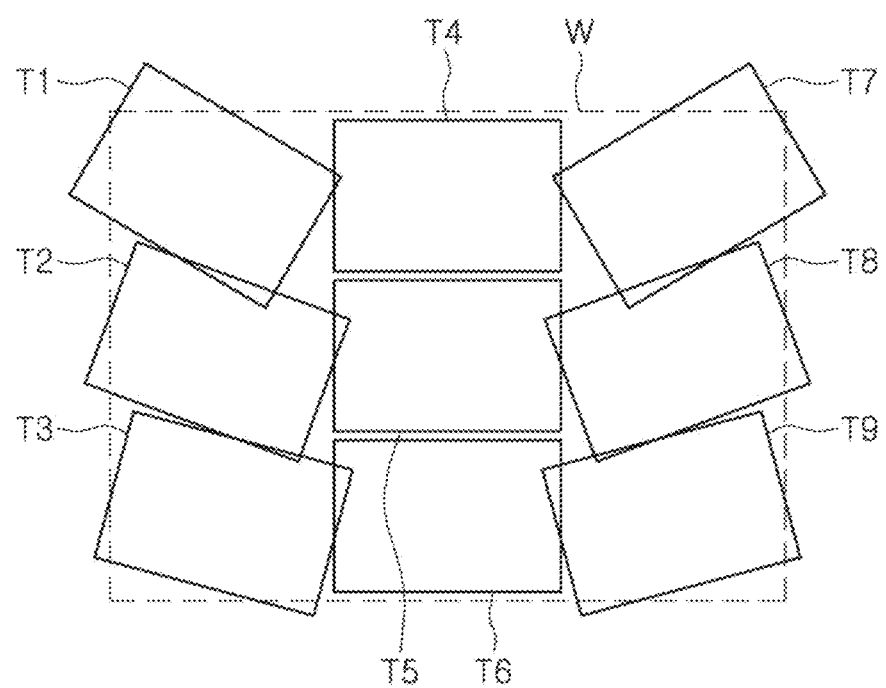
FIG. 13 is a reference diagram illustrating a captured image of a plurality of camera modules mounted on a portable electronic device according to an example.

FIG. 13 illustrates ranges of a subject which may be captured using the first camera module 1000 and the second camera module 2000 mounted in a portable electronic device 1 according to an example.

A second camera module 2000 having a relatively wide field of view may capture an image of a subject having a relatively large area, and the first camera module 1000 having a relatively narrow field of view may capture an image of a subject having a relatively small area.

In particular, the first camera module 1000 may capture an image of an internal region having a wide imaging range W captured by the second camera module 2000 within tele-imaging ranges T1 to T9. The image captured within the tele-imaging ranges t1 to T9 may be displayed in an image captured within the wide imaging range W. The first camera module 1000 may capture a portion of an internal region to overlap outside of the wide-image range W at the tele-imaging ranges T1 to T9, or may capture an external region of the wide-image range W.

Since the first camera module 1000 includes a reflection module rotating about the first rotation axis and the second rotation axis intersecting the optical axis (the Z-axis), an image captured by the first camera module 1000 may be inclined to an image captured by the second camera module 2000 because an imaging angle is changed by rotation of the reflection module. Among the tele-imaging range illustrated in the reference diagram of FIG. 3, T1 to T3 or T6 to T9 are a case in which an angle is changed by rotation of the reflection module.

Accordingly, in the case in which an image of a subject is captured by the first camera module 1000 within T1 to T3 or T6 to T9 among the tele-imaging ranges, a captured image may be rotated to be aligned with a captured image of the second camera module 2000 to implement a PIP function.

To implement such functions, the camera modules 1000 and 2000 or the portable electronic device 1 may include a controller for editing images or implementing a PIP function.

As described above, a camera module, according to an example, may easily adjust a camera shake even in moving images, obtained by imaging a moving subject, as well as still images obtained by imaging a fixed subject.

In addition, a camera module, according to an example, is rotatable at an angle wide enough to implement a tracking function when moving images are captured.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing;
a first frame and a second frame sequentially disposed in the housing in an optical axis direction,
the second frame comprising a lens module configured to rotate together with the second frame about a first rotation axis and a second rotation axis, intersecting an optical axis direction,
the first rotation axis being formed between the housing and an opposing surface of the first frame in the optical axis direction by first ball members disposed in a direction intersecting the optical axis direction, and
the second rotation axis being formed between the first frame and an opposing surface of the second frame in the optical axis direction by second ball members disposed in a direction intersecting the optical axis direction and the first rotation axis direction; and
a first magnetic material and a second magnetic material, spaced apart from each other in the optical axis direction, selectively disposed between the second frame and the housing,
wherein the first magnetic material and the second magnetic material prevent separation of the first ball members and the second ball members, which support the rotation of the lens module.

2. The camera module of claim 1, wherein the first ball members and the second ball members are disposed to rotate in their respective positions or to be maintained in a fixed state.

3. The camera module of claim 1, wherein an intersection of the first rotation axis and the second rotation axis is configured to coincide with the optical axis.

4. The camera module of claim 3, wherein the first rotation axis and the second rotation axis are configured to intersect at right angles.

5. The camera module of claim 1, wherein the housing has a rectangular box contour, and each of the first rotation axis and the second rotation axis is diagonally formed with respect to the housing.

6. The camera module of claim 1, wherein the second frame comprises an image sensor disposed below the lens module, and the image sensor is configured to rotate together with the lens module.

7. The camera module of claim 1, wherein an optical axis of the lens module is configured to correspondingly change with the rotation of the second frame.

8. The camera module of claim 6, wherein the second frame comprises a sensor substrate on which the image sensor is mounted, and
the sensor substrate is connected to a main substrate, included in the housing, by a flexible substrate.

9. The camera module of claim 8, wherein the flexible substrate comprises a signal or power line divided into a plurality of signal or power lines separated from each other.

10. The camera module of claim 8, wherein the flexible substrate comprises flexible substrates each connected to an edge of the main substrate to form a cross.

11. The camera module of claim 1, wherein the second frame or the lens module comprises the first magnetic material, the housing or an auxiliary member connected to the housing comprises the second magnetic material, and
the second frame is attracted to the housing by a magnetic force of the first magnetic material and the second magnetic material.

12. The camera module of claim 11, wherein the first magnetic material is an attractive magnet and the second magnetic material is an attractive yoke.

13. The camera module of claim 11, wherein the first magnetic material and the second magnetic material are disposed to be spaced at regular intervals along an optical axis.

14. A camera module comprising:
a fixed portion including a housing; and
a rotation module portion disposed in the housing and forming a movable portion,
the rotation module portion comprising a lens module, an image sensor, and a first magnetic material,
the lens module and the image sensor being configured to rotate about a first rotation axis and a second rotation axis, intersecting an optical axis direction,
the fixed portion comprising a second magnetic material, and
the rotation module portion being attracted to the fixed portion by a magnetic force of the first magnetic material and the second magnetic material in the optical axis direction,
wherein the first magnetic material and the second magnetic material prevent separation of first ball members and second ball members, which support a rotation of the lens module.

15. The camera module of claim 14, wherein the first magnetic material and the second magnetic material are disposed to be spaced at regular intervals along an optical axis.

16. An electronic device comprising:
a plurality of camera modules configured to have different fields of view, and one of the camera modules comprising:
a housing;
a first frame and a second frame sequentially disposed in the housing in an optical axis direction,
the second frame comprising a lens module configured to rotate together with the second frame about a first rotation axis and a second rotation axis, intersecting the optical axis direction,
the first rotation axis being formed between the housing and an opposing surface of the first frame in the optical axis direction by first ball members disposed in a direction intersecting the optical axis direction, and the second rotation axis being formed between the first frame and an opposing surface of the second frame in the optical axis direction by second ball members disposed in a direction intersecting the optical axis direction and the first rotation axis direction; and a first magnetic material and a second magnetic material, spaced apart from each other in the optical axis direction, selectively disposed between the second frame and the housing, wherein the first magnetic material and the second magnetic material prevent separation of the first ball members and the second ball members, which support a rotation of the lens module.

17. The electronic device of claim 16, wherein the first ball members and the second ball members are disposed to rotate in their respective positions or to be maintained in a fixed state.

18. The electronic device of claim 16, wherein an intersection of the first rotation axis and the second rotation axis are configured to coincide with the optical axis.

19. The electronic device of claim 18, wherein the first rotation axis and the second rotation axis are configured to intersect at right angles.

20. The electronic device of claim 16, wherein the housing has a rectangular contour, and each of the first rotation axis and the second rotation axis is diagonally formed with respect to the housing.

21. The electronic device of claim 16, wherein the second frame comprises an image sensor disposed below the lens module, and the image sensor rotates together with the lens module.

22. The electronic device of claim 16, wherein an optical axis of the lens module is configured to correspondingly change with the rotation of the second frame.

23. The electronic device of claim 21, wherein the second frame comprises a sensor substrate on which the image sensor is mounted, and the sensor substrate is connected to a main substrate, included in the housing, by a flexible substrate.

24. The electronic device of claim 23, wherein the flexible substrate comprises a signal or power line divided into a plurality of signal or power lines separated from each other.

25. The electronic device of claim 23, wherein the flexible substrate comprises flexible substrates each connected to an edge of the main substrate to form a cross.

26. The electronic device of claim 16, wherein the second frame or the lens module comprises the first magnetic material, the housing or an auxiliary member connected to the housing comprises the second magnetic material, and the second frame is attracted to the housing by a magnetic force of the first magnetic material and the second magnetic material.

27. The electronic device of claim 26, wherein the first magnetic material is an attractive magnet and the second magnetic material is an attractive yoke.

28. The electronic device of claim 26, wherein the first magnetic material and the second magnetic material are disposed to be spaced at regular intervals along an optical axis.

* * * * *